US008095661B2

(12) United States Patent
Tripathi

(10) Patent No.: US 8,095,661 B2
(45) Date of Patent: Jan. 10, 2012

(54) METHOD AND SYSTEM FOR SCALING APPLICATIONS ON A BLADE CHASSIS

(75) Inventor: Sunay Tripathi, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 520 days.

(21) Appl. No.: 11/953,843

(22) Filed: Dec. 10, 2007

(65) Prior Publication Data
US 2009/0150547 A1    Jun. 11, 2009

(51) Int. Cl.
G06F 15/173 (2006.01)
G06F 15/177 (2006.01)
G06F 15/16 (2006.01)
G06F 11/00 (2006.01)
G01R 31/08 (2006.01)
G08C 15/00 (2006.01)
H04J 1/16 (2006.01)
H04J 3/14 (2006.01)
H04L 1/00 (2006.01)
H04L 12/26 (2006.01)

(52) U.S. Cl. ........ 709/226; 709/220; 709/221; 709/222; 709/223; 709/224; 709/225; 709/227; 370/229; 370/231

(58) Field of Classification Search .......... 709/223–226, 709/242–244; 370/210–410
See application file for complete search history.

(56) References Cited

U.S. PATENT DOCUMENTS

| 6,041,053 A | 3/2000 | Douceur et al. |
| 6,070,219 A | 5/2000 | McAlpine et al. |
| 6,131,163 A | 10/2000 | Wiegel |
| 6,163,539 A | 12/2000 | Alexander et al. |
| 6,269,401 B1 * | 7/2001 | Fletcher et al. ............... 709/224 |
| 6,477,643 B1 | 11/2002 | Vorbach et al. |
| 6,594,775 B1 * | 7/2003 | Fair .................................. 714/4 |
| 6,600,721 B2 | 7/2003 | Edholm |
| 6,714,960 B1 | 3/2004 | Bitar et al. |

(Continued)

FOREIGN PATENT DOCUMENTS
WO    2005057318 A2    6/2005

(Continued)

OTHER PUBLICATIONS

Tripathi, S.; "Solaris Networking—The Magic Revealed (Part I)"; Sunay Tripathi's Solaris Networking Weblog; Nov. 14, 2005, pp. 1-22 (22 pages).

(Continued)

Primary Examiner — Carl Colin
Assistant Examiner — Catherine Thiaw
(74) Attorney, Agent, or Firm — Osha • Liang LLP

(57) ABSTRACT

In general, in one aspect, the invention relates to a method for scaling an application. The method includes executing a first instance of the application on a first computer in a chassis, where the first instance of the application is associated with a first VNIC and a second VNIC executing on the first computer. The method further includes loading a second instance of the application on a second computer in the chassis, where the second instance of the application is associated with a third VNIC and a fourth VNIC executing on the second computer. The method further includes re-programming a network express manager in the chassis to direct a portion of network traffic directed to the first VNIC to the third VNIC and executing the second instance of the application after the re-programming.

14 Claims, 10 Drawing Sheets

U.S. PATENT DOCUMENTS

| | | | |
|---|---|---|---|
| 6,757,731 | B1 | 6/2004 | Barnes et al. |
| 6,771,595 | B1 | 8/2004 | Gilbert et al. |
| 6,831,893 | B1 | 12/2004 | Ben Nun et al. |
| 6,859,841 | B2 | 2/2005 | Narad et al. |
| 6,944,168 | B2 | 9/2005 | Paatela et al. |
| 6,985,937 | B1 | 1/2006 | Keshav et al. |
| 7,046,665 | B1 | 5/2006 | Walrand et al. |
| 7,111,303 | B2 | 9/2006 | Macchiano et al. |
| 7,146,431 | B2 | 12/2006 | Hipp et al. |
| 7,177,311 | B1 | 2/2007 | Hussain et al. |
| 7,200,704 | B2 | 4/2007 | Njoku et al. |
| 7,260,102 | B2 | 8/2007 | Mehrvar et al. |
| 7,313,142 | B2 | 12/2007 | Matsuo et al. |
| 7,450,498 | B2 * | 11/2008 | Golia et al. ............... 370/225 |
| 7,502,884 | B1 * | 3/2009 | Shah et al. ............... 710/316 |
| 7,561,531 | B2 * | 7/2009 | Lewites et al. ............... 370/401 |
| 7,620,955 | B1 | 11/2009 | Nelson |
| 7,633,955 | B1 | 12/2009 | Saraiya et al. |
| 7,688,838 | B1 | 3/2010 | Aloni et al. |
| 7,694,298 | B2 * | 4/2010 | Goud et al. ............... 718/1 |
| 7,730,486 | B2 | 6/2010 | Herington |
| 2002/0052972 | A1 | 5/2002 | Yim |
| 2002/0080721 | A1 | 6/2002 | Tobagi et al. |
| 2003/0037154 | A1 | 2/2003 | Poggio et al. |
| 2003/0120772 | A1 * | 6/2003 | Husain et al. ............... 709/224 |
| 2004/0015966 | A1 | 1/2004 | MacChiano et al. |
| 2004/0170127 | A1 | 9/2004 | Tanaka |
| 2004/0199808 | A1 | 10/2004 | Freimuth et al. |
| 2004/0202182 | A1 | 10/2004 | Lund et al. |
| 2004/0210623 | A1 | 10/2004 | Hydrie et al. |
| 2004/0267866 | A1 | 12/2004 | Carollo et al. |
| 2005/0111455 | A1 | 5/2005 | Nozue et al. |
| 2005/0135243 | A1 | 6/2005 | Lee et al. |
| 2005/0138620 | A1 | 6/2005 | Lewites |
| 2005/0182853 | A1 | 8/2005 | Lewites et al. |
| 2005/0251802 | A1 | 11/2005 | Bozek et al. |
| 2006/0041667 | A1 | 2/2006 | Ahn et al. |
| 2006/0045089 | A1 | 3/2006 | Bacher et al. |
| 2006/0070066 | A1 | 3/2006 | Grobman |
| 2006/0092928 | A1 | 5/2006 | Pike et al. |
| 2006/0174324 | A1 | 8/2006 | Zur et al. |
| 2006/0206300 | A1 | 9/2006 | Garg et al. |
| 2006/0206602 | A1 * | 9/2006 | Hunter et al. ............... 709/223 |
| 2006/0233168 | A1 | 10/2006 | Lewites et al. |
| 2006/0236063 | A1 | 10/2006 | Hausauer et al. |
| 2006/0253619 | A1 | 11/2006 | Torudbakken et al. |
| 2007/0047536 | A1 * | 3/2007 | Scherer et al. ............... 370/360 |
| 2007/0078988 | A1 * | 4/2007 | Miloushev et al. ............... 709/227 |
| 2007/0083723 | A1 * | 4/2007 | Dey et al. ............... 711/163 |
| 2007/0101323 | A1 | 5/2007 | Foley et al. |
| 2007/0244937 | A1 * | 10/2007 | Flynn et al. ............... 707/204 |
| 2007/0244972 | A1 * | 10/2007 | Fan ............... 709/205 |
| 2008/0002683 | A1 | 1/2008 | Droux et al. |
| 2008/0005748 | A1 * | 1/2008 | Mathew et al. ............... 719/318 |
| 2008/0019365 | A1 | 1/2008 | Tripathi et al. |
| 2008/0022016 | A1 | 1/2008 | Tripathi et al. |
| 2008/0043765 | A1 * | 2/2008 | Belgaied et al. ............... 370/409 |
| 2008/0144635 | A1 * | 6/2008 | Carollo et al. ............... 370/397 |
| 2008/0171550 | A1 | 7/2008 | Zhao |
| 2008/0192648 | A1 | 8/2008 | Galles |
| 2008/0225875 | A1 | 9/2008 | Wray et al. |
| 2008/0239945 | A1 * | 10/2008 | Gregg ............... 370/217 |
| 2008/0253379 | A1 * | 10/2008 | Sasagawa ............... 370/395.5 |
| 2008/0270599 | A1 * | 10/2008 | Tamir et al. ............... 709/224 |
| 2009/0006593 | A1 * | 1/2009 | Cortes ............... 709/223 |
| 2009/0125752 | A1 * | 5/2009 | Chan et al. ............... 714/3 |
| 2010/0046531 | A1 * | 2/2010 | Louati et al. ............... 370/401 |

FOREIGN PATENT DOCUMENTS

| | | | |
|---|---|---|---|
| WO | WO2005057318 | * | 6/2005 |
| WO | 2008093174 A1 | | 8/2008 |
| WO | WO2008093174 | * | 7/2010 |

OTHER PUBLICATIONS

Tripathi, S.; "CrossBow: Solaris Network Virtualization and Resource Control"; Crossbow Architectual Document, Nov. 21, 2006; 19 pages.

Nordmark, E. et al. ; "IP Instances Interface Document"; PSARC 2006/366, Dec. 28, 2006; 17 pages.

Nordmark, E.; "IP Instances Design Document"; PSARC 2006/366, Dec. 21, 2006; 38 pages.

Tripathi, S.; "CrossBow: Solaris Network Virtualization & Resource Control"; CrossBow Overview Document, Aug. 23, 2006; 12 pges.

Nordmark, E.; "IP Instances—Network Isolation Meets Zones"; presented at the SVOSUG meeting, Oct. 26, 2006; 28 pages.

Tripathi, S.; "CrossBow: Network Virtualization and Resource Control"; presented at the SVOSUG meeting, Aug. 24, 2006; 28 pages.

Tripathi, S.; "Crossbow: ReCap"; presented at an internal Sun Labs Open House presentation on Jun. 1, 2006, made public Aug. 2006; 23 pages.

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001 (11 Pages).

International Search Report issued in PCT/US2009/035405, dated Aug. 19, 2009 (14 pages).

International Preliminary Report on Patentability issued in PCT/US2009/035405, Dated Sep. 10, 2010. (2 pages).

Goldenberg, D. et al.; "Zero Copy Sockets Direct Protocol over InfiniBand—Preliminary Implementation and Performance Analysis"; Proceedings of the 13th Symposium on High Performance Interconnects; Piscataway, NJ; Aug. 17-19, 2005; pp. 128-137 (10 pages).

"I/O Virtualization Using Mellanox InfiniBand And Channel I/O Virtualization (CIOV) Technology"; XP-002541674; Jan. 1, 2007; Retrieved from the Internet: <http://www.mellanox.com/pdf/whitepapers/WP_Virtualize_with_IB.pdf>, pp. 1-16 (16 pages).

"InfiniBand Software Stack"; XP-002541744; Jan. 1, 2006; Retrieved from the Internet: <http://download.microsoft.com/download/c/3/1/c318044c-95e8-4df9-a6af-81cdcb3c53c5/Mellanox%20Technologies%20-%20Infiniband%20Software/%20Stack%20-%20WinIB%20-%20external.PDF>; pp. 1-2 (2 pages).

Wheeler, B.; "10 Gigabit Ethernet In Servers: Benefits and Challenges"; XP-002541745; Jan. 1, 2005; Retrieved from the Internet: <http://www.hp.com/products1/serverconnectivity/adapters/ethernet/10gbe/infolibrary/10GbE_White_Paper.pdf> (8 pages).

"Windows Platform Design Notes: Winsock Direct and Protocol Offload on SANs"; XP-002541746; Mar. 3, 2001; Retrieved from the Internet: <http://download.microsoft.com/download/1/6/1/161ba512-40e2-4cc9-843a-923143f3456c/WinsockDirect-ProtocolOffload.doc> (8 pages).

International Search Report from PCT/US2009/048594 dated Sep. 7, 2009 (5 pages).

Written Opinion from PCT/US2009/048594 dated Sep. 7, 2009 (7 page).

Popuri, S., OpenSolaris Virtualization Technologies, Feb. 23, 2007, Retrieved from the Internet,<hub.opensolaris.org/bin/view/Community+Group+advocacy/techdays%2Darchive%2D06%2D07>, 42 pages.

Kumar, R., ASI and PCI Express: Complementary Solutions, Dec. 1, 2004, RTC Magazine, Retrieved from the Internet <rtcmagazine.com/articles/view/100274>, (5 pages).

Martinez, R., Alfaro, F.J., and Sanchez, J.L., Providing Quality of Service Over Advanced Switching, Jan. 1, 2006, IEEE, Retrieved from the Internet, <ieeexplore.ieee.org/xpls/abs_all.jsp?arnumber=1655667&tag=1>, 10 pages.

Apani, Brave New World, Feb. 1, 2007, iSmile, Retrieved from the Internet, <isimile.com/PDFs/Apani_Segmentation_WP.pdf>, 8 pages.

Trapeze, Trapeze Overview, Jan. 1, 1998, USENIX, Retrieved from the Internet, <usenix.org/publications/library/proceedings/usenix98/full_papers/anderson/anderson_html/node4.html>, 2 pages.

Office Action in United States Patent and Trademark Office for U.S. Appl. No. 11/953,829, Mailed Aug. 4, 2010 (30 Pages).

Office Action in United States Patent and Trademark Office for U.S. Appl. No. 11/953,837, Mailed Jun. 11, 2010 (27 Pages).

Office Action in United States Patent and Trademark Office for U.S. Appl. No. 11/953,839, Mailed Aug. 19, 2010 (30 Pages).

Office Action in United States Patent and Trademark Office for U.S. Appl. No. 12/040,165, Mailed Feb. 8, 2010 (40 Pages).

Notice of Allowance in United States Patent and Trademark Office for U.S. Appl. No. 12/040,165, Mailed Oct. 29, 2010 (18 Pages).
Office Action in United States Patent and Trademark Office for U.S. Appl. No. 12/040,101, Mailed May 6, 2010 (39 Pages).
Office Action in United States Patent and Trademark Office for U.S. Appl. No. 11/953,842, Mailed Apr. 30, 2010 (39 Pages).
Final Office Action in United States Patent and Trademark Office for U.S. Appl. No. 11/953,842, Mailed Oct. 15, 2010 (32 Pages).
Office Action in United States Patent and Trademark Office for U.S. Appl. No. 12/040,105, Mailed Nov. 20, 2009 (93 Pages).
Final Office Action in United States Patent and Trademark Office for U.S. Appl. No. 12/040,105, Mailed May 26, 2010 (26 Pages).
Notice of Allowance in United States Patent and Trademark Office for U.S. Appl. No. 12/040,105, Mailed Oct. 5, 2010 (27 Pages).
Office Action in United States Patent and Trademark Office for U.S. Appl. No. 12/053,666, Mailed Dec. 10, 2009 (36 Pages).
Final Office Action in United States Patent and Trademark Office for U.S. Appl. No. 12/053,666, Mailed Jun. 11, 2010 (27 Pages).
Notice of Allowance in United States Patent and Trademark Office for U.S. Appl. No. 12/053,666, Mailed Oct. 7, 2010 (15 Pages).
Office Action in United States Patent and Trademark Office for U.S. Appl. No. 12/053,676, Mailed Dec. 9, 2009 (41 Pages).
Notice of Allowance in United States Patent and Trademark Office for U.S. Appl. No. 12/053,676, Mailed Jul. 15, 2010 (20 Pages).
Office Action in United States Patent and Trademark Office for U.S. Appl. No. 11/953,843, Mailed May 3, 2010 (169 Pages).
Office Action in United States Patent and Trademark Office for U.S. Appl. No. 11/953,843, Mailed Oct. 15, 2010 (33 pages).
Final Office Action in United States Patent and Trademark Office for U.S. Appl. No. 12/040,101, Mailed Dec. 13, 2010 (25 pages).

* cited by examiner

METHOD AND SYSTEM FOR SCALING APPLICATIONS ON A BLADE CHASSIS

CROSS-REFERENCE TO RELATED APPLICATIONS

The present application contains subject matter that may be related to the subject matter in the following U.S. applications filed on Dec. 10, 2007, and assigned to the assignee of the present application: "Method and System for Creating a Virtual Network Path" with U.S. application Ser. No. 11/953,829; "Method and System for Controlling Network Traffic In a Blade" with U.S. application Ser. No. 11/953,832; "Method and System for Reconfiguring a Virtual Network Path" with U.S. application Ser, No. 11/953,837; "Method and System for Enforcing Resource Constraints For Virtual Machines Across Migration" with U.S. application Ser. No. 11/953,839; and "Method and System for Monitoring Virtual Wires" with U.S. application Ser. No. 11/953,842.

BACKGROUND

Conventionally, in the computer-related arts, a network is an arrangement of physical computer systems configured to communicate with each other. In some cases, the physical computer systems include virtual machines, which may also be configured to interact with the network (i.e., communicate with other physical computers and/or virtual machines in the network). Many different types of networks exist, and a network may be classified based on various aspects of the network, such as scale, connection method, functional relationship of computer systems in the network, and/or network topology.

Regarding connection methods, a network may be broadly categorized as wired (using a tangible connection medium such as Ethernet cables) or wireless (using an intangible connection medium such as radio waves). Different connection methods may also be combined in a single network. For example, a wired network may be extended to allow devices to connect to the network wirelessly. However, core network components such as routers, switches, and servers are generally connected using physical wires. Ethernet is defined within the Institute of Electrical and Electronics Engineers (IEEE) 802.3 standards, which are supervised by the IEEE 802.3 Working Group.

To create a wired network, computer systems must be physically connected to each other. That is, the ends of physical wires (for example, Ethernet cables) must be physically connected to network interface cards in the computer systems forming the network. To reconfigure the network (for example, to replace a server or change the network topology), one or more of the physical wires must be disconnected from a computer system and connected to a different computer system.

SUMMARY

In general, in one aspect, the invention relates to a method and system for creating and managing a virtual network path between virtual machines in a network, wherein the virtual machines are located on different computers connected to a chassis interconnect.

In general, in one aspect, the invention relates to a method for scaling an application. The method includes executing a first instance of the application on a first computer in a chassis, wherein the first instance of the application is associated with a first VNIC and a second VNIC executing on the first computer, loading a second instance of the application on a second computer in the chassis, wherein the second instance of the application is associated with a third VNIC and a fourth VNIC executing on the second computer, re-programming a network express manager in the chassis to direct a portion of network traffic directed to the first VNIC to the third VNIC, and executing the second instance of the application after the re-programming.

Other aspects of the invention will be apparent from the following description and the appended claims.

DETAILED DESCRIPTION

Figure 1:
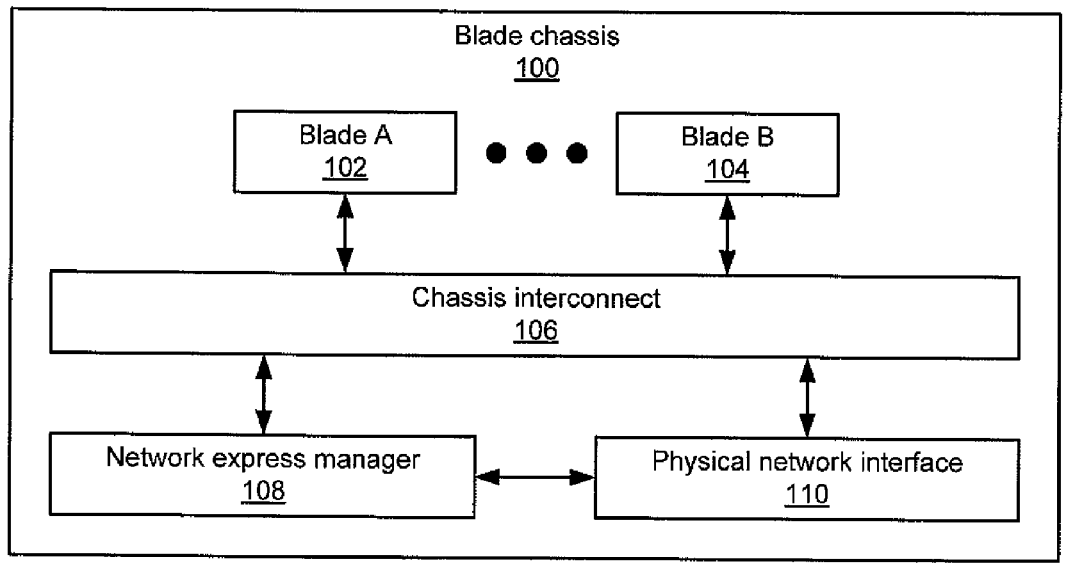
FIG. 1 shows a diagram of a blade chassis in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for scaling applications on a blade chassis. More specifically, embodiments of the invention provide a method and system for dynamically scaling applications based on resource usage, available resources, etc.

FIG. 1 shows a diagram of a blade chassis (100) in accordance with one or more embodiments of the invention. The blade chassis (100) includes multiple blades (e.g., blade A (102), blade B (104)) communicatively coupled with a chassis interconnect (106). For example, the blade chassis (100) may be a Sun Blade 6048 Chassis by Sun Microsystems Inc., an IBM BladeCenter® chassis, an HP BladeSystem enclosure by Hewlett Packard Inc., or any other type of blade chassis. The blades may be of any type(s) compatible with the blade chassis (100). BladeCenter® is a registered trademark of International Business Machines, Inc. (IBM), headquartered in Armonk, N.Y.

In one or more embodiments of the invention, the blades are configured to communicate with each other via the chassis interconnect (106). Thus, the blade chassis (100) allows for communication between the blades without requiring traditional network wires (such as Ethernet cables) between the blades. For example, depending on the type of blade chassis (100), the chassis interconnect (106) may be a Peripheral Component Interface Express (PCI-E) backplane, and the blades may be configured to communicate with each other via PCI-E endpoints. Those skilled in the art will appreciate that other connection technologies may be used to connect the blades to the blade chassis.

Continuing with the discussion of FIG. 1, to communicate with clients outside the blade chassis (100), the blades are configured to share a physical network interface (110). The physical network interface (110) includes one or more network ports (for example, Ethernet ports), and provides an interface between the blade chassis (100) and the network (i.e., interconnected computer systems external to the blade chassis (100)) to which the blade chassis (100) is connected. The blade chassis (100) may be connected to multiple networks, for example using multiple network ports.

In one or more embodiments, the physical network interface (110) is managed by a network express manager (108). Specifically, the network express manager (108) is configured to manage access by the blades to the physical network interface (110). The network express manager (108) may also be configured to manage internal communications between the blades themselves, in a manner discussed in detail below. The network express manager (108) may be any combination of hardware, software, and/or firmware including executable logic for managing network traffic.

Figure 2:
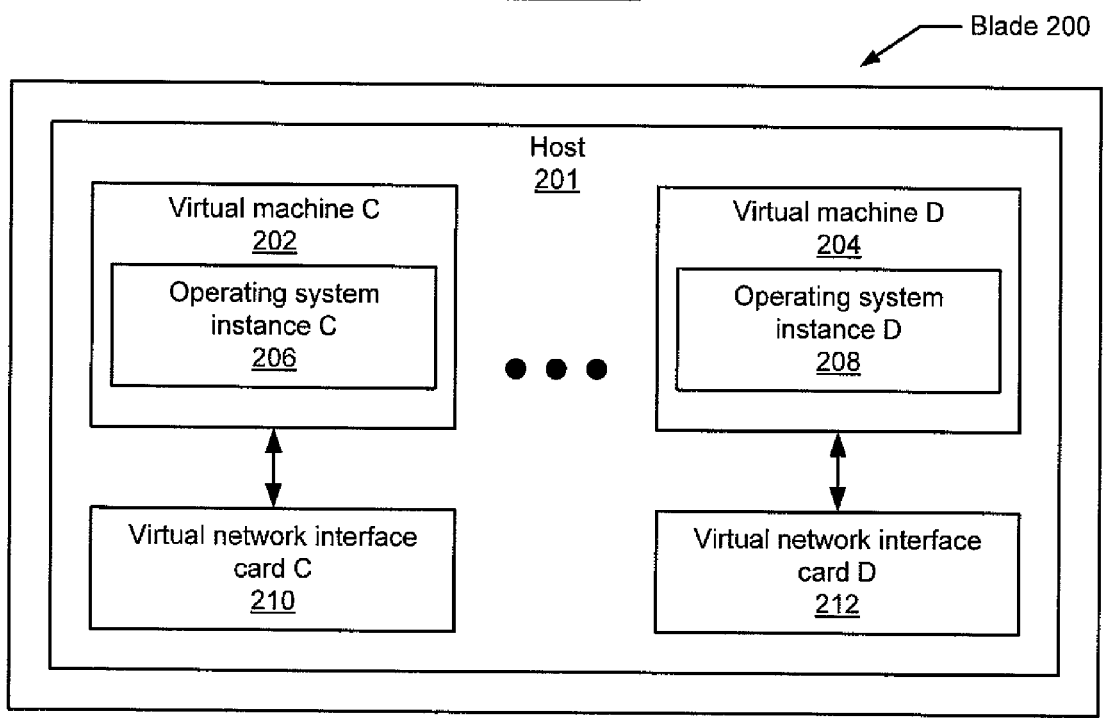
FIG. 2 shows a diagram of a blade in accordance with one or more embodiments of the invention.

FIG. 2 shows a diagram of a blade (200) in accordance with one or more embodiments of the invention. "Blade" is a term of art referring to a computer system located within a blade chassis (for example, the blade chassis (100) of FIG. 1). Blades typically include fewer components than stand-alone computer systems or conventional servers. In one embodiment of the invention, fully featured stand-alone computer systems or conventional servers may also be used instead of or in combination with the blades. Generally, blades in a blade chassis each include one or more processors and associated memory. Blades may also include storage devices (for example, hard drives and/or optical drives) and numerous other elements and functionalities typical of today's computer systems (not shown), such as a keyboard, a mouse, and/or output means such as a monitor. One or more of the aforementioned components may be shared by multiple blades located in the blade chassis. For example, multiple blades may share a single output device.

Continuing with discussion of FIG. 2, the blade (200) includes a host operating system (not shown) configured to execute one or more virtual machines (e.g., virtual machine C (202), virtual machine D (204)). Broadly speaking, the virtual machines are distinct operating environments configured to inherit underlying functionality of the host operating system via an abstraction layer. In one or more embodiments of the invention, each virtual machine includes a separate instance of an operating system (e.g., operating system instance C (206), operating system instance D (208)). For example, the Xen® virtualization project allows for multiple guest operating systems executing in a host operating system. Xen® is a trademark overseen by the Xen Project Advisory Board. In one embodiment of the invention, the host operating system supports virtual execution environments (not shown). An example of virtual execution environment is a Solaris™ Container. In such cases, the Solaris™ Container may execute in the host operating system, which may be a Solaris™ operating system. Solaris™ is a trademark of Sun Microsystems, Inc. In one embodiment of the invention, the host operating system may include both virtual machines and virtual execution environments.

Many different types of virtual machines and virtual execution environment exist. Further, the virtual machines may include many different types of functionality, such as a switch, a router, a firewall, a load balancer, an application server, any other type of network-enabled service, or any combination thereof.

In one or more embodiments of the invention, the virtual machines and virtual execution environments inherit network connectivity from the host operating system via VNICs (e.g., VNIC C (210), VNIC D (212)). To the virtual machines and the virtual execution environments, the VNICs appear as physical NICs. In one or more embodiments of the invention, the use of VNICs allows an arbitrary number of virtual machines or and virtual execution environments to share the blade's (200) networking functionality. Further, in one or more embodiments of the invention, each virtual machine or and virtual execution environment may be associated with an arbitrary number of VNICs, thereby providing increased flexibility in the types of networking functionality available to the virtual machines and/or and virtual execution environments. For example, a virtual machine may use one VNIC for incoming network traffic, and another VNIC for outgoing network traffic. VNICs in accordance with one or more embodiments of the invention are described in detail in commonly owned U.S. patent application Ser. No. 11/489,942, entitled "Multiple Virtual Network Stack Instances using Virtual Network Interface Cards," in the names of Nicolas G. Droux, Erik Nordmark, and Sunay Tripathi, the contents of which are hereby incorporated by reference in their entirety.

VNICs in accordance with one or more embodiments of the invention also are described in detail in commonly owned U.S. patent application Ser. No. 11/480,000, entitled "Method and System for Controlling Virtual Machine Bandwidth" in the names of Sunay Tripathi, Tim P. Marsland, and Nicolas G. Droux the contents of which are hereby incorporated by reference in their entirety.

In one embodiment of the invention, one of the blades in the blade chassis includes a control operating system executing in a virtual machine (also referred to as the control virtual machine). The control operating system is configured to manage the creation and maintenance of the virtual wires and/or virtual network paths (discussed below). In addition, the control operating system also includes functionality to scale applications in the blade chassis (discussed below).

Figure 3:
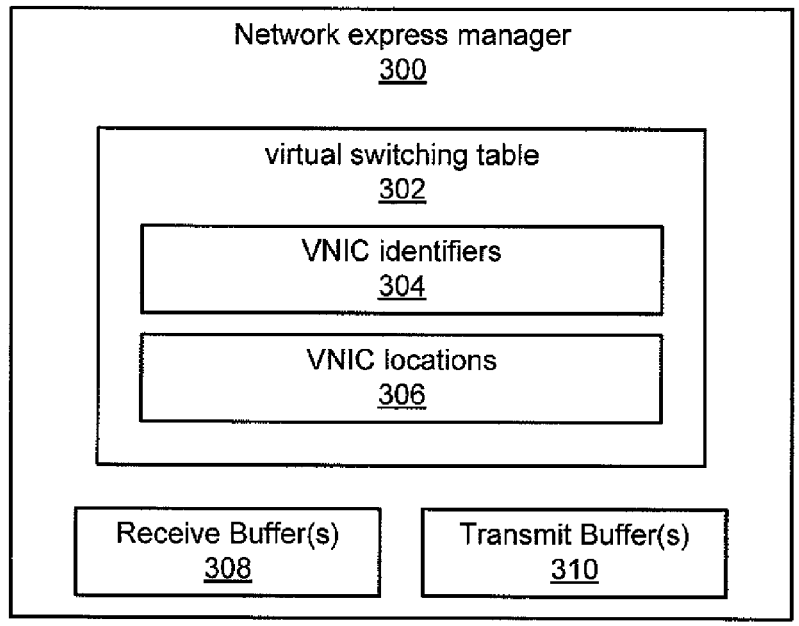
FIG. 3 shows a diagram of a network express manager in accordance with one or more embodiments of the invention.

Continuing with the discussion of FIG. 2, each blade's networking functionality (and, by extension, networking functionality inherited by the VNICs) includes access to a shared physical network interface and communication with other blades via the chassis interconnect. FIG. 3 shows a diagram of a network express manager (300) in accordance with one or more embodiments of the invention. The network express manager (300) is configured to route network traffic traveling to and from VNICs located in the blades. Specifically, the network express manager (300) includes a virtual switching table (302), which includes a mapping of VNIC identifiers (304) to VNIC locations (306) in the chassis interconnect. In one or more embodiments, the VNIC identifiers (304) are Internet Protocol (IP) addresses, and the VNIC locations (306) are PCI-E endpoints associated with the blades (e.g., if the chassis interconnect is a PCI-E backplane). In another embodiment of the invention, the VNIC identifiers (304) may be media access control (MAC) addresses. Alternatively, another routing scheme may be used.

In one or more embodiments, the network express manager (300) is configured to receive network traffic via the physical network interface and route the network traffic to the appropriate location (i.e., where the VNIC is located) using the virtual switching table (302). In one embodiment of the invention, once a determination is made about where to route a given packet, the packet is stored in the appropriate receive buffer (308) or transmit buffer (310). In one embodiment of the invention, each VNIC listed in the virtual switching table (302) is associated with a receive buffer (308) and a transmit buffer (310). The receive buffer (308) is configured to temporarily store packets destined for a given VNIC prior to the VNIC receiving (via a polling or interrupt mechanism) the packets. Similarly, the transmit buffer (310) is configured to temporarily store packets received from the VNIC prior to send the packet towards its packet destination.

In one embodiment of the invention, the receive buffer (308) enables the VNICs to implement bandwidth control. More specifically, when the VNIC is implementing bandwidth control, packets remain in the receive buffer (308) until the VNIC (or an associated process) requests packets from the receive buffer (308). As such, if the rate at which packets are received is greater than the rate at which packets requested by the VNIC (or an associated process), then packets may be dropped from the receive buffer once the receive buffer is full. Those skilled in the art will appreciate that the rate at which packets are dropped from the receive buffer is determined by the size of the receive buffer.

Continuing with the discussion of FIG. 3, the network express manager (300) may be configured to route network traffic between different VNICs located in the blade chassis. In one or more embodiments of the invention, using the virtual switching table (302) in this manner facilitates the creation of a virtual network path, which includes virtual wires (discussed below). Thus, using the virtual switching table (302), virtual machines located in different blades may be interconnected to form an arbitrary virtual network topology, where the VNICs associated with each virtual machine do not need to know the physical locations of other VNICs. Further, if a virtual machine is migrated from one blade to another, the virtual network topology may be preserved by updating the virtual switching table (302) to reflect the corresponding VNIC's new physical location (for example, a different PCI-E endpoint).

In some cases, network traffic from one VNIC may be destined for a VNIC located in the same blade, but associated with a different virtual machine. In one or more embodiments of the invention, a virtual switch may be used to route the network traffic between the VNICs independent of the blade chassis. Virtual switches in accordance with one or more embodiments of the invention are discussed in detail in commonly owned U.S. patent application Ser. No. 11/480,261, entitled "Virtual Switch," in the names of Nicolas G. Droux, Sunay Tripathi, and Erik Nordmark, the contents of which are hereby incorporated by reference in their entirety.

Figure 4:
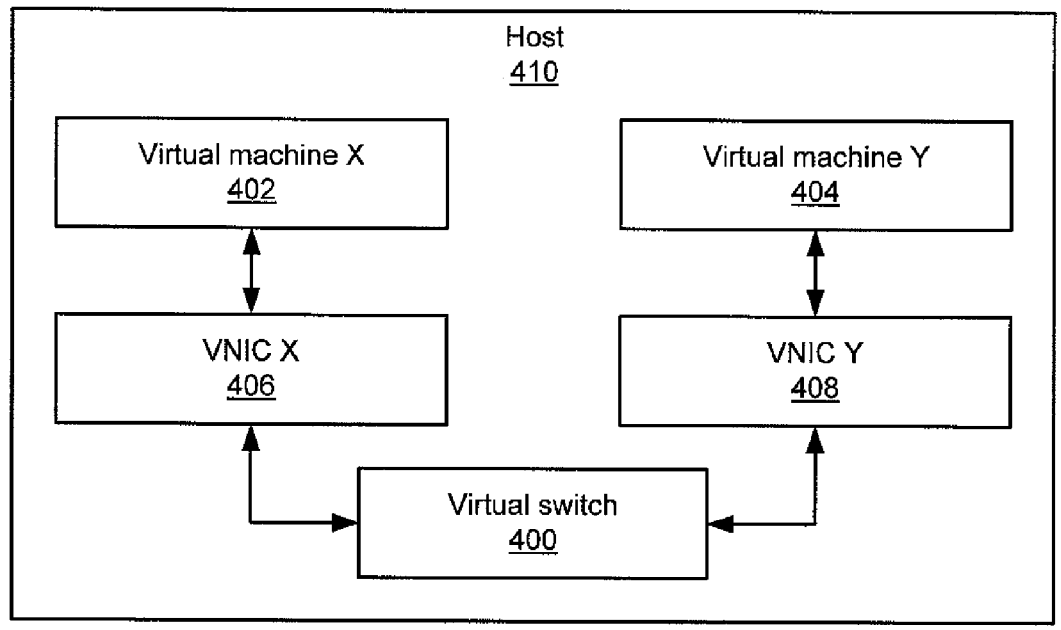
FIG. 4 shows a diagram of a virtual machine in accordance with one or more embodiments of the invention.

For example, FIG. 4 shows a diagram of a virtual switch (400) in accordance with one or more embodiments of the invention. The virtual switch (400) provides connectivity between VNIC X (406) associated with virtual machine X (402) and VNIC Y (408) associated with virtual machine Y (404). In one or more embodiments, the virtual switch (400) is managed by a host (410) within which virtual machine X (402) and virtual machine Y (404) are located. Specifically, the host (410) may be configured to identify network traffic targeted at a VNIC in the same blade, and route the traffic to the VNIC using the virtual switch (400). In one or more embodiments of the invention, the virtual switch (400) may reduce utilization of the blade chassis and the network express manager by avoiding unnecessary round-trip network traffic.

Figure 5:
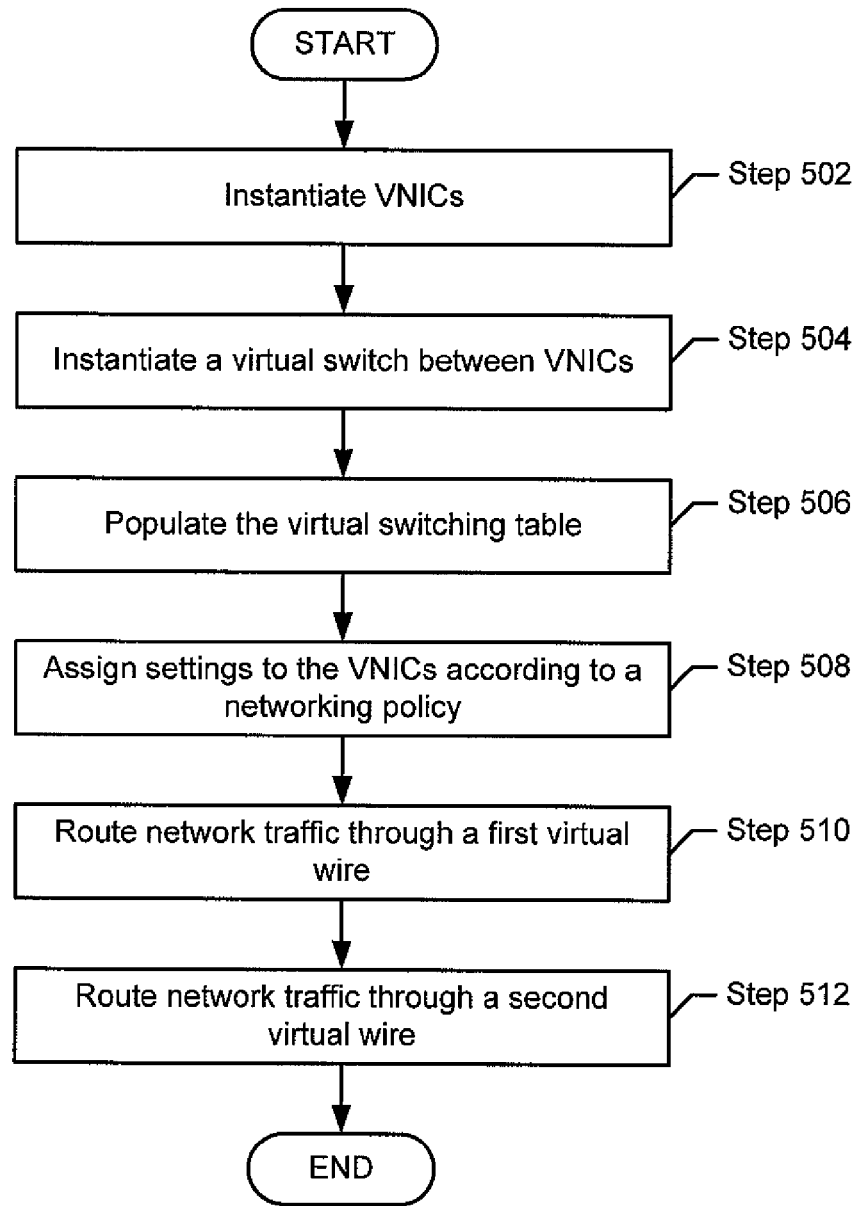
FIG. 5 shows a flowchart of a method for creating a virtual network path in accordance with one or more embodiments of the invention.

FIG. 5 shows a flowchart of a method for creating a virtual network path in accordance with one or more embodiments of the invention. In one or more embodiments of the invention, one or more of the steps shown in FIG. 5 may be omitted, repeated, and/or performed in a different order. Accordingly, embodiments of the invention should not be considered limited to the specific arrangement of steps shown in FIG. 5.

In one or more embodiments of the invention, in Step 502, VNICs are instantiated for multiple virtual machines. The virtual machines are located in blades, as discussed above. Further, the virtual machines may each be associated with one or more VNICs. In one or more embodiments of the invention, instantiating a VNIC involves loading a VNIC object in memory and registering the VNIC object with a host, i.e., an operating system that is hosting the virtual machine associated with the VNIC. Registering the VNIC object establishes an interface between the host's networking functionality and the abstraction layer provided by the VNIC. Thereafter, when the host receives network traffic addressed to the VNIC, the host forwards the network traffic to the VNIC. Instantiation of VNICs in accordance with one or more embodiments of the invention is discussed in detail in U.S. patent application Ser. No. 11/489,942, incorporated by reference above.

As discussed above, a single blade may include multiple virtual machines configured to communicate with each other. In one or more embodiments of the invention, in Step 504, a virtual switch is instantiated to facilitate communication between the virtual machines. As noted above, the virtual switch allows communication between VNICs independent of the chassis interconnect. Instantiation of virtual switches in accordance with one or more embodiments of the invention is discussed in detail in U.S. patent application Ser. No. 11/480,261, incorporated by reference above.

In one or more embodiments of the invention, in Step 506, a virtual switching table is populated. As noted above, the virtual switching table may be located in a network express manager configured to manage network traffic flowing to and from the virtual machines. Populating the virtual switching table involves associating VNIC identifiers (for example, IP addresses) with VNIC locations (for example, PCI-E endpoints). In one or more embodiments of the invention, the virtual switching table is populated in response to a user command issued via a control operating system, i.e., an operating system that includes functionality to control the network express manager.

In one or more embodiments of the invention, VNICs include settings for controlling the processing of network packets. In one or more embodiments of the invention, in Step 508, settings are assigned to the VNICs according to a networking policy. Many different types of networking policies may be enforced using settings in the VNICs. For example, a setting may be used to provision a particular portion of a blade's available bandwidth to one or more VNICs. As another example, a setting may be used to restrict use of a VNIC to a particular type of network traffic, such as Voice over IP (VoIP) or Transmission Control Protocol/IP (TCP/IP). Further, settings for multiple VNICs in a virtual network path may be identical. For example, VNICs in a virtual network path may be capped at the same bandwidth limit, thereby allowing for consistent data flow across the virtual network path. In one or more embodiments of the invention, a network express manager is configured to transmit the desired settings to the VNICs.

In one or more embodiments of the invention, once the VNICs are instantiated and the virtual switching table is populated, network traffic may be transmitted from a VNIC in one blade to a VNIC in another blade. The connection between the two VNICs may be thought of as a "virtual wire," because the arrangement obviates the need for traditional network wires such as Ethernet cables. A virtual wire functions similar to a physical wire in the sense that network traffic passing through one virtual wire is isolated from network traffic passing through another virtual wire, even though the network traffic may pass through the same blade (i.e., using the same virtual machine or different virtual machines located in the blade).

In one embodiment of the invention, each virtual wire may be associated with a priority (discussed below in FIGS. 9A-9B). In addition, each virtual wire may be associated with a security setting, which defines packet security (e.g., encryption, etc.) for packets transmitted over the virtual wire. In one embodiment of the invention, the bandwidth, priority and security setting are defined on a per-wire basis.

In one embodiment of the invention, a combination of two or more virtual wires may be thought of as a "virtual network path." In one embodiment of the invention, the bandwidth, priority and security settings for all virtual wires in the virtual network path are the same.

Continuing with the discussion of FIG. 5, once the virtual wires and/or virtual network paths have been created and configured, network traffic may be transmitted over the virtual network path through, for example, a first virtual wire (Step 510) and then through a second virtual wire (Step 512). For example, when receiving network traffic from a client via the physical network interface, one virtual wire may be located between the physical network interface and a VNIC, and a second virtual wire may be located between the VNIC and another VNIC.

In one embodiment of the invention, at least Steps 502-508 are performed and/or managed by the control operating system.

Figure 6A:
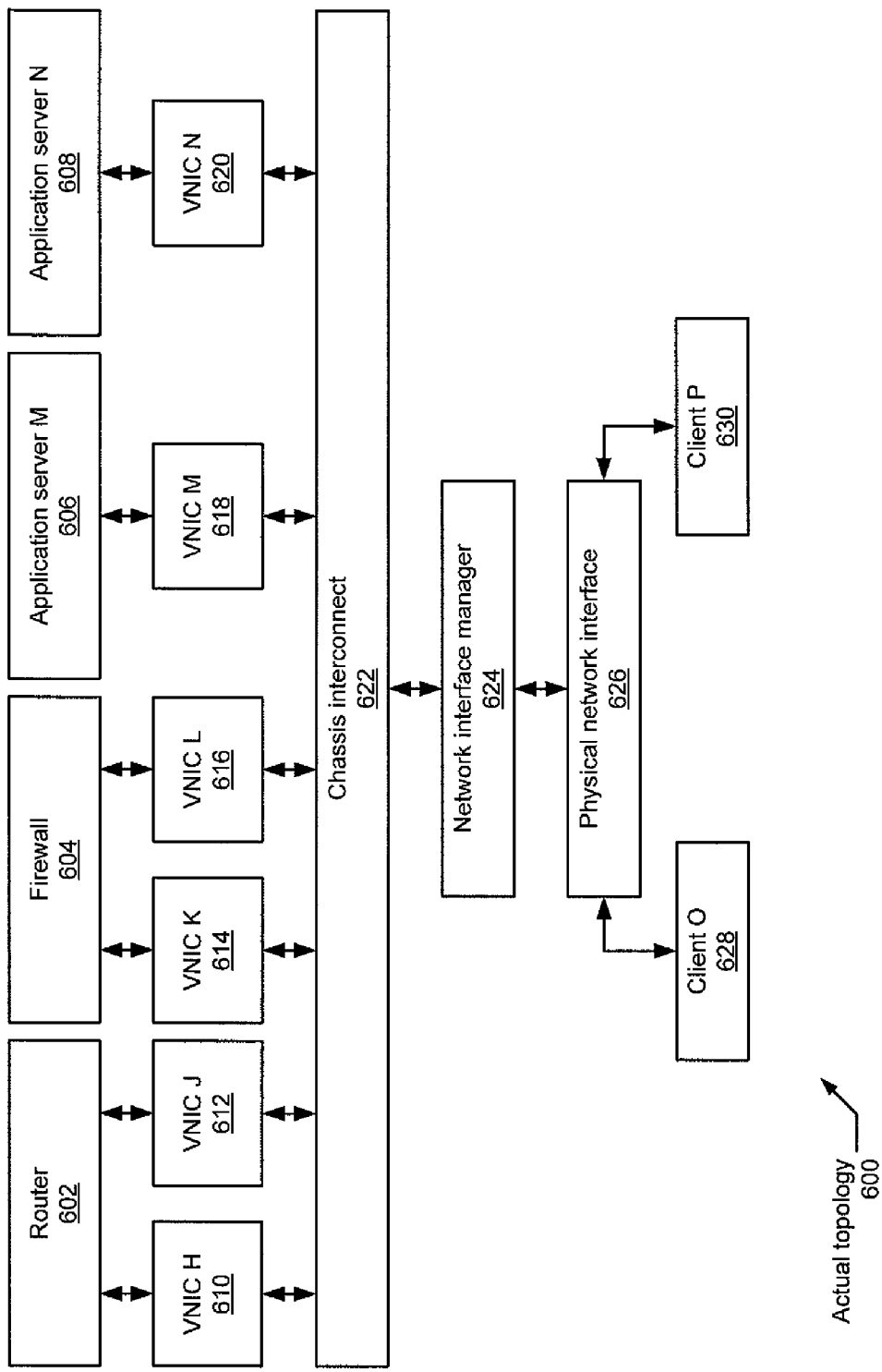
FIGS. 6A-6C show an example of creating virtual network paths in accordance with one or more embodiments of the invention.
Figure 6B:
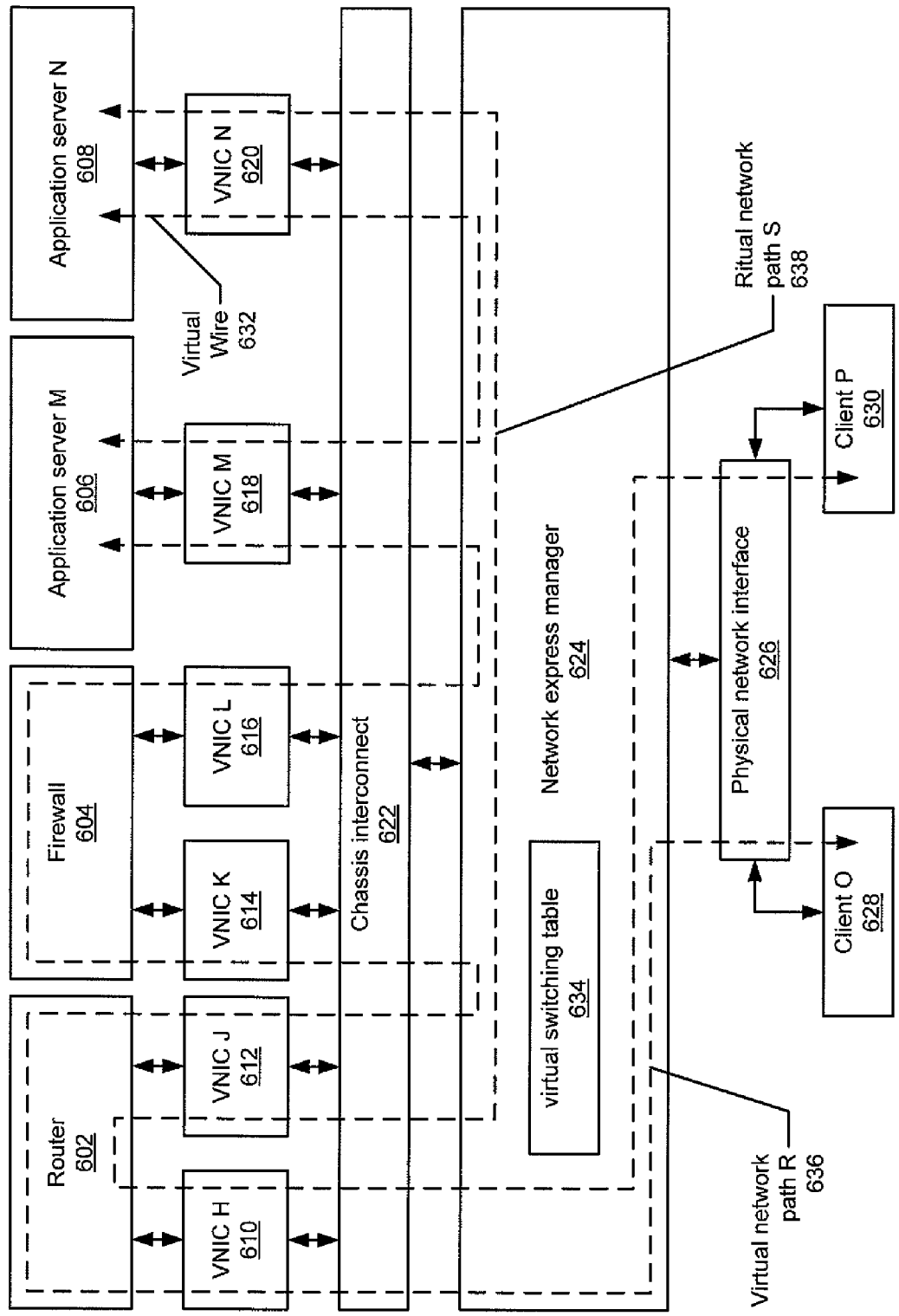
Figure 6C:
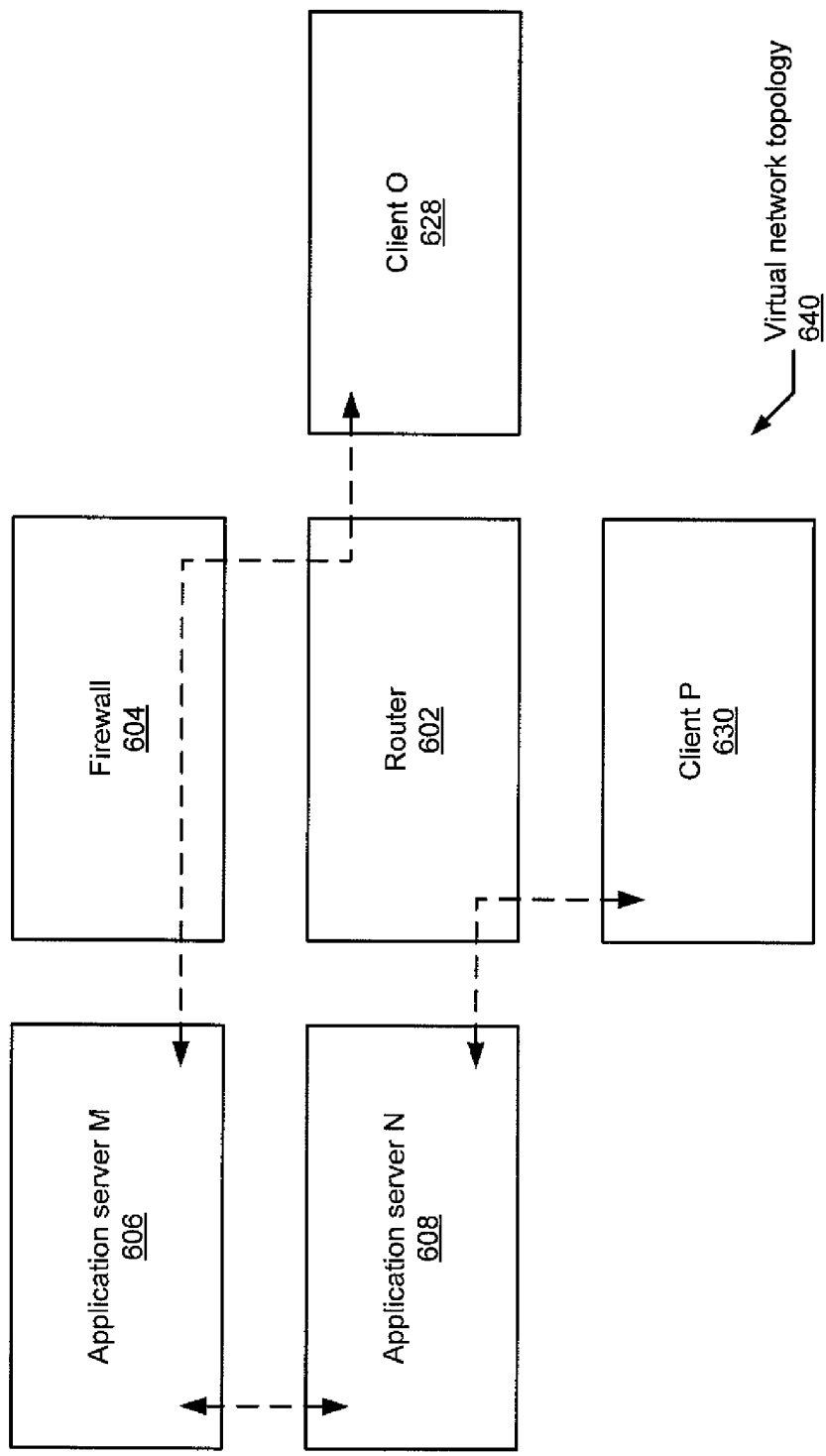

FIGS. 6A-6C show an example of creating virtual network paths in accordance with one or more embodiments of the invention. Specifically, FIG. 6A shows a diagram of an actual topology (600) in accordance with one or more embodiments of the invention, FIG. 6B shows how network traffic may be routed through the actual topology (600), and FIG. 6C shows a virtual network topology (640) created by routing network traffic as shown in FIG. 6B. FIGS. 6A-6C are provided as examples only, and should not be construed as limiting the scope of the invention.

Referring first to FIG. 6A, the actual topology (600) includes multiple virtual machines. Specifically, the actual topology (600) includes a router (602), a firewall (604), application server M (606), and application server N (608), each executing in a separate virtual machine. The virtual machines are located in blades communicatively coupled with a chassis interconnect (622), and include networking functionality provided by the blades via VNICs (i.e., VNIC H (610), VNIC J (612), VNIC K (614), VNIC M (618), and VNIC N (620)). As shown in FIG. 6A, each virtual machine is communicatively coupled to all other virtual machines. However, as discussed below, while there is full connectivity between the virtual machines, embodiments of the invention create virtual wires and/or virtual network paths to limit the connectivity of the virtual machines. For ease of illustration, the blades themselves are not shown in the diagram.

In one or more embodiments of the invention, the router (602), the firewall (604), application server M (606), and application server N (608) are each located in separate blades. Alternatively, as noted above, a blade may include multiple virtual machines. For example, the router (602) and the firewall (604) may be located in a single blade. Further, each virtual machine may be associated with a different number of VNICs than the number of VNICs shown in FIG. 6A.

Continuing with discussion of FIG. 6A, a network express manager (624) is configured to manage network traffic flowing to and from the virtual machines. Further, the network express manager (624) is configured to manage access to a physical network interface (626) used to communicate with client O (628) and client P (630).

In FIG. 6A, the virtual machines, VNICs, chassis interconnect (622), network express manager (624), and physical network interface (626) are all located within a chassis interconnect. Client O (628) and client P (630) are located in one or more networks (not shown) to which the chassis interconnect is connected.

FIG. 6B shows how network traffic may be routed through the actual topology (600) in accordance with one or more embodiments of the invention. In one or more embodiments of the invention, the routing is performed by the network express manager (624) using a virtual switching table (634).

As discussed above, network traffic routed to and from the VNICs may be thought of as flowing through a "virtual wire." For example, FIG. 6B shows a virtual wire (632) located between application server M (606) and application server N (608). To use the virtual wire, application server M (606) transmits a network packet via VNIC M (618). The network packet is addressed to VNIC N (620) associated with application server N (608). The network express manager (624) receives the network packet via the chassis interconnect (622), inspects the network packet, and determines the target VNIC location using the virtual switching table (634). If the target VNIC location is not found in the virtual switching table (634), then the network packet may be dropped. In this example, the target VNIC location is the blade in which VNIC N (620) is located. The network express manager (624) routes the network packet to the target VNIC location, and application server N (608) receives the network packet via VNIC N (620), thereby completing the virtual wire (632). In one or more embodiments of the invention, the virtual wire (632) may also be used to transmit network traffic in the opposite direction, i.e., from application server N (608) to application server M (606).

Further, as discussed above, multiple virtual wires may be combined to form a "virtual network path." For example, FIG. 6B shows virtual network path R (636), which flows from client O (628), through the router (602), through the firewall (604), and terminates at application server M (606). Specifically, the virtual network path R (636) includes the following virtual wires. A virtual wire is located between the physical network interface (626) and VNIC H (610). Another virtual wire is located between VNIC J (612) and VNIC K (614). Yet another virtual wire is located between VNIC L (616) and VNIC M (618). If the router (602) and the firewall (604) are located in the same blade, then a virtual switch may be substituted for the virtual wire located between VNIC J (612) and VNIC K (614), thereby eliminating use of the chassis interconnect (622) from communications between the router (602) and the firewall (604).

Similarly, FIG. 6B shows virtual network path S (638), which flows from client P (630), through the router (602), and terminates at application server N (608). Virtual network path S (638) includes a virtual wire between the physical network interface (626) and VNIC H (610), and a virtual wire between VNIC J (612) and VNIC N (620). The differences between virtual network path R (636) and virtual network path S (638) exemplify how multiple virtual network paths may be located in the same blade chassis.

In one or more embodiments of the invention, VNIC settings are applied separately for each virtual network path. For example, different bandwidth limits may be used for virtual network path R (636) and virtual network path S (638). Thus, the virtual network paths may be thought of as including many of the same features as traditional network paths (e.g., using Ethernet cables), even though traditional network wires are not used within the blade chassis. However, traditional network wires may still be required outside the blade chassis, for example between the physical network interface (626) and client O (628) and/or client P (630).

FIG. 6C shows a diagram of the virtual network topology (640) resulting from the use of the virtual network path R (636), virtual network path S (638), and virtual wire (632) shown in FIG. 6B. The virtual network topology (640) allows the various components of the network (i.e., router (602), firewall (604), application server M (606), application server N (608), client O (628), and client P (630)) to interact in a manner similar to a traditional wired network. However, as discussed above, communication between the components located within the blade chassis (i.e., router (602), firewall (604), application server M (606), and application server N (608)) is accomplished without the use of traditional network wires.

Embodiments of the invention allow for virtual network paths to be created using virtual wires, without the need for traditional network wires. Specifically, by placing virtual machines in blades coupled via a chassis interconnect, and routing network traffic using VNICs and a virtual switching table, the need for traditional network wires between the virtual machines is avoided. Thus, embodiments of the invention facilitate the creation and reconfiguration of virtual network topologies without the physical labor typically involved in creating a traditional wired network.

Figure 7A:
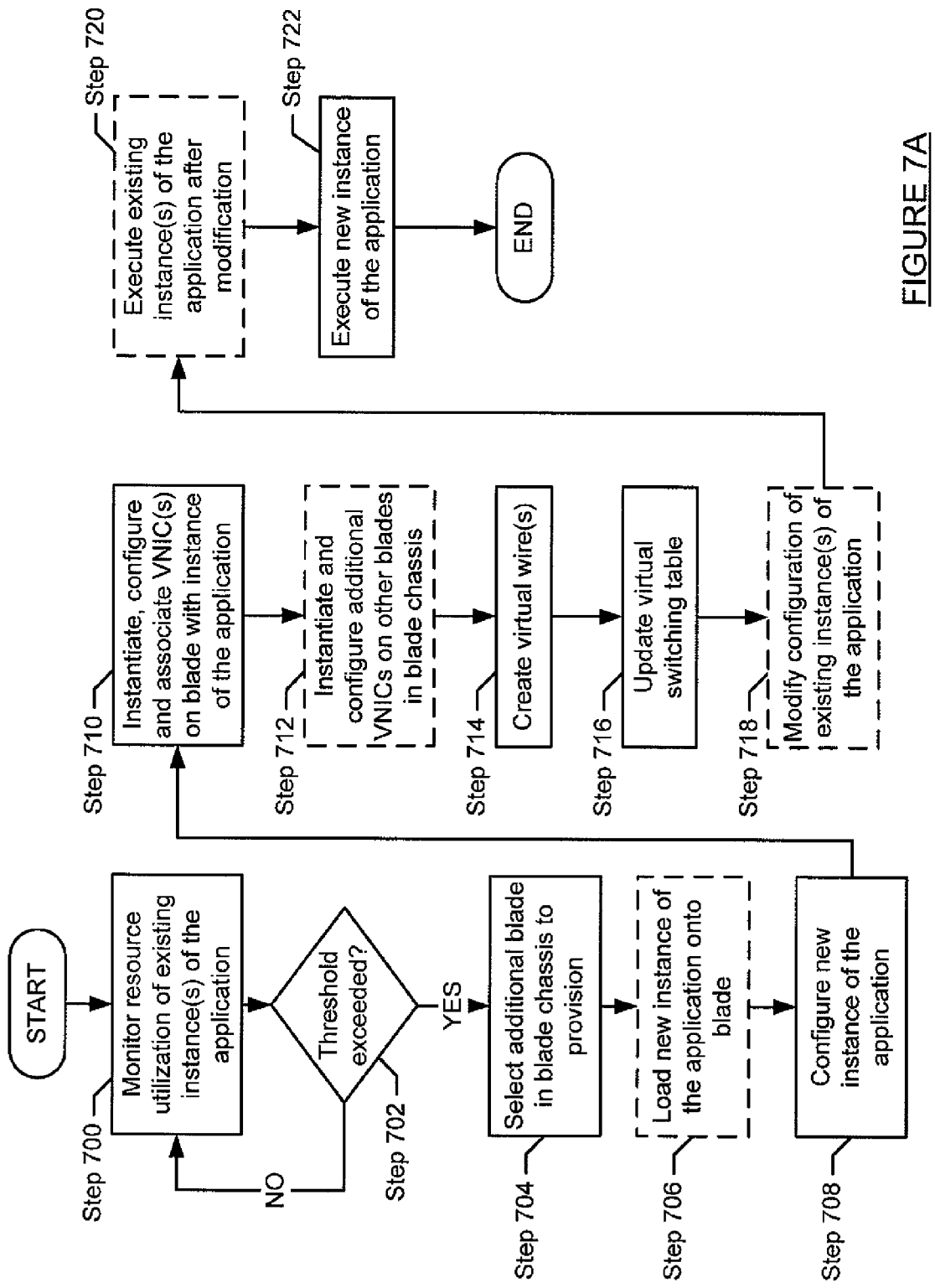
FIGS. 7A-7B show a flowchart of a method for scaling an application in accordance with one or more embodiments of the invention.

In one embodiment of the invention, an application executing on a blade within the blade chassis may be scaled up or down depending on, for example, the resource utilization of the application, resources available on other blades within the blade chassis, etc. In one embodiment of the invention, scaling up an application corresponds to adding at least one additional instance of the application on a separate blade in the blade chassis. A method in accordance with one embodiment of the invention for scaling up an application is shown in FIG. 7A. In one embodiment of the invention, scaling down an application corresponds to removing at least one instance of the application from a blade in the blade chassis. A method in accordance with one embodiment of the invention for scaling down an application is shown in FIG. 7B.

Figure 7B:
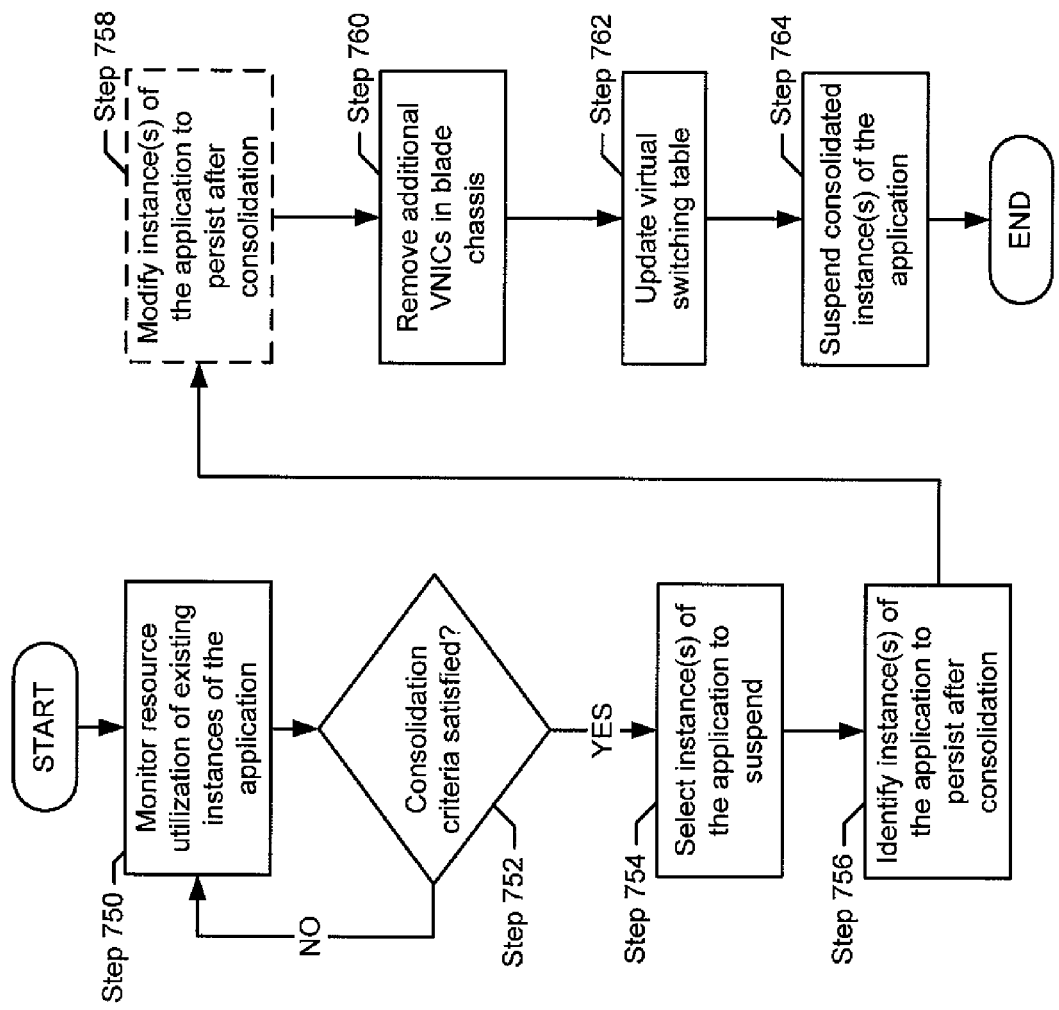

FIGS. 7A-7B show flowcharts of a method for scaling applications in accordance with one or more embodiments of the invention. In one or more embodiments of the invention, one or more of the steps shown in FIGS. 7A-7B may be omitted, repeated, and/or performed in a different order. Accordingly, embodiments of the invention should not be considered limited to the specific arrangement of steps shown in FIG. 7A-7B.

Referring to FIG. 7A, in Step 700, resource usage of the instances of the application are monitored. In one embodiment of the invention, the instances of the application correspond to all instances of the application executing on blades within the blade chassis. In one embodiment of the invention, resource utilization may include, but is not limited, the amount of blade resources (e.g., memory, bandwidth, processing time, etc.) each instance of the application is using and the performance of each instance of the application (e.g., is the instance of the application processing incoming network traffic at a sufficient rate to satisfy the specified quality of service (QOS) for the instance of the application). In Step 702, a determination is made about whether a threshold has been exceeded. In one embodiment of the invention, this determination is made based on the information obtained in Step 700. In one embodiment of the invention, the threshold corresponds to one or more criteria used to determine whether an additional instance of the application is required. For example, the threshold may indicate when the QOS (e.g., packets processed per second) falls below a certain value, then an additional instance of the application is required, If a determination is made that the threshold has been exceeded, the method proceeds to Step 704. Alternatively, the method proceeds to Step 700.

In Step 704, once a determination is made that a new instance of the application is required, a blade, within the blade chassis, is selected to host the new instance of the application. In one embodiment of the invention, the selected blade is not currently executing any instances of the application. In Step 706, the new instance of the application is loaded on to the blade selected in Step 704. In one embodiment of the invention, Step 706 is optional as the instance of the application may already be loaded onto blade. For example, all the blades in the blade chassis may all be loaded with an instance of the application and the various instances of the application may only be executed as needed.

In Step 708, the new instance of the application is configured. Alternatively, in Step 708 the configuration of the previously loaded instance of the application is verify and/or updated (not shown). In one embodiment, regardless of which Step 708 is performed, the instance of the application is configured in order to enable execution on the blade on which it is located. In Step 710, one or more VNICs are instantiated on the blade (i.e., the blade selected in Step 704), configured, and associated with the new instance of the application. In one embodiment of the invention, associating the VNICs with the new instance of the application may include performing additional configuration on the new instance of the application such that the new instance of the application can use the VNICs.

Optionally, in Step 712, one or more VNICs are instantiated and configured on other blades in the blade chassis. For example, one or more VNICs may need to be instantiated in order for the new instance of the application to communicate with a virtual machine located on another blade in the blade chassis. In Step 714, one or more virtual wires are created between the VNICs instantiated in Step 710 and existing VNICs and/or VNICs instantiated in Step 712. The virtual wires enable the new instance of the application to communicate with the virtual machines on other blades in the blade chassis. In one embodiment of the invention, creating the virtual wires includes updating the virtual switching table.

In Step 716, the virtual switching table is updated. In one embodiment of the invention, Step 716 includes updating the virtual switching table to re-direct a portion of the network traffic currently destined for the existing instances of the application to the new instance of the application. Optionally, in Step 718, one or more of the existing instances of the application are modified. Depending on the application, one or more of the existing instances of the application may need to be modified in order to operate with the new instance of the application. For example, if the application is a router, then the routing table for one or more of the existing instances of the application may be modified to remove one or more routing table entries. These routing table entries may then be used to populate the routing table associated with the new instance of the application.

Optionally, in Step 720, execution of the one or more of the existing instances of the application is resumed after being modified in Step 718. If the existing instances of the application have not been modified, then Step 720 is typically not performed. In Step 722, the new instance of the application is executed.

Referring to FIG. 7B, in Step 750, resource usage of the instances of the application are monitored. In one embodiment of the invention, the instances of the application corresponds to all instances of the application executing on blades within the blade chassis. In one embodiment of the invention, resource utilization may include, but is not limited, the amount of blade resources (e.g., memory, bandwidth, processing time, etc.) each instance of the application is using and the performance of each instance of the application (e.g., is the instance of the application processing incoming network traffic at a sufficient rate to satisfy the specified quality of service (QOS) for the instance of the application).

In Step 752, a determination is made about whether a consolidation criteria has been satisfied. In one embodiment of the invention, this determination is made based on the information obtained in Step 750. In one embodiment of the invention, the consolidation criteria corresponds to one or more criteria used to determine whether to remove (or suspend execution of) one or more an instance of the application. For example, the consolidation criteria may indicate that after 5:00 pm only three instances of the application are required in order to reduce power utilization of blades in the blade chassis. In another example, the consolidation criteria may indicate that if the average resource utilization across all blades executing an instance of the application in the blade chassis is below a certain level, then execution of one or more instances of the application may be suspended. If a determination is made that the consolidation criteria has been satisfied, the method proceeds to Step 754. Alternatively, the method proceeds to Step 750.

In Step 754, one or more instances of the application to suspend are selected. In one embodiment of the invention, the selection of the instances of the application to suspend may be based on a policy implemented by the control operating system. In Step 756, instances of the application that are to persist (i.e. continue execution) after the consolidation are identified.

Optionally, in Step 758, the instances of the application identified in Step 756 are modified. For example, if the application is a router and the routing table is divided across the instances of the router, then the routing table associated with instances of the application identified in Step 756 may need to be updated to include entries from the routing table(s) associated with the instance(s) of the application identified in Step 754. In Step 760, one or more VNICs are removed in the blade chassis. Specifically, the VNICs associated with the instance(s) of the application identified in Step 754 are removed (or their execution suspended). In addition, the VNICs on other blades connected, via virtual wires, to VNICs associated with the instance(s) of the application identified in Step 754 are removed (or their activity is suspended).

In Step 762, the virtual switching table is updated to redirect network traffic currently directed to the instance(s) of the application identified in Step 754 to one or more instances of the application that will persist after the consolidation. In Step 764, the execution of the instance(s) of the application identified in Step 754 is suspended, thereby completing the consolidation.

In one embodiment of the invention, the methods in FIGS. 7A and 7B may operate concurrently in order to optimize the number of instances of the application executing on blades within the blade chassis. Further, in the event that there is a conflict between the two methods (i.e., to scale up or scale down), then a policy may be applied to determine which of the two methods takes precedence.

Figure 8A:
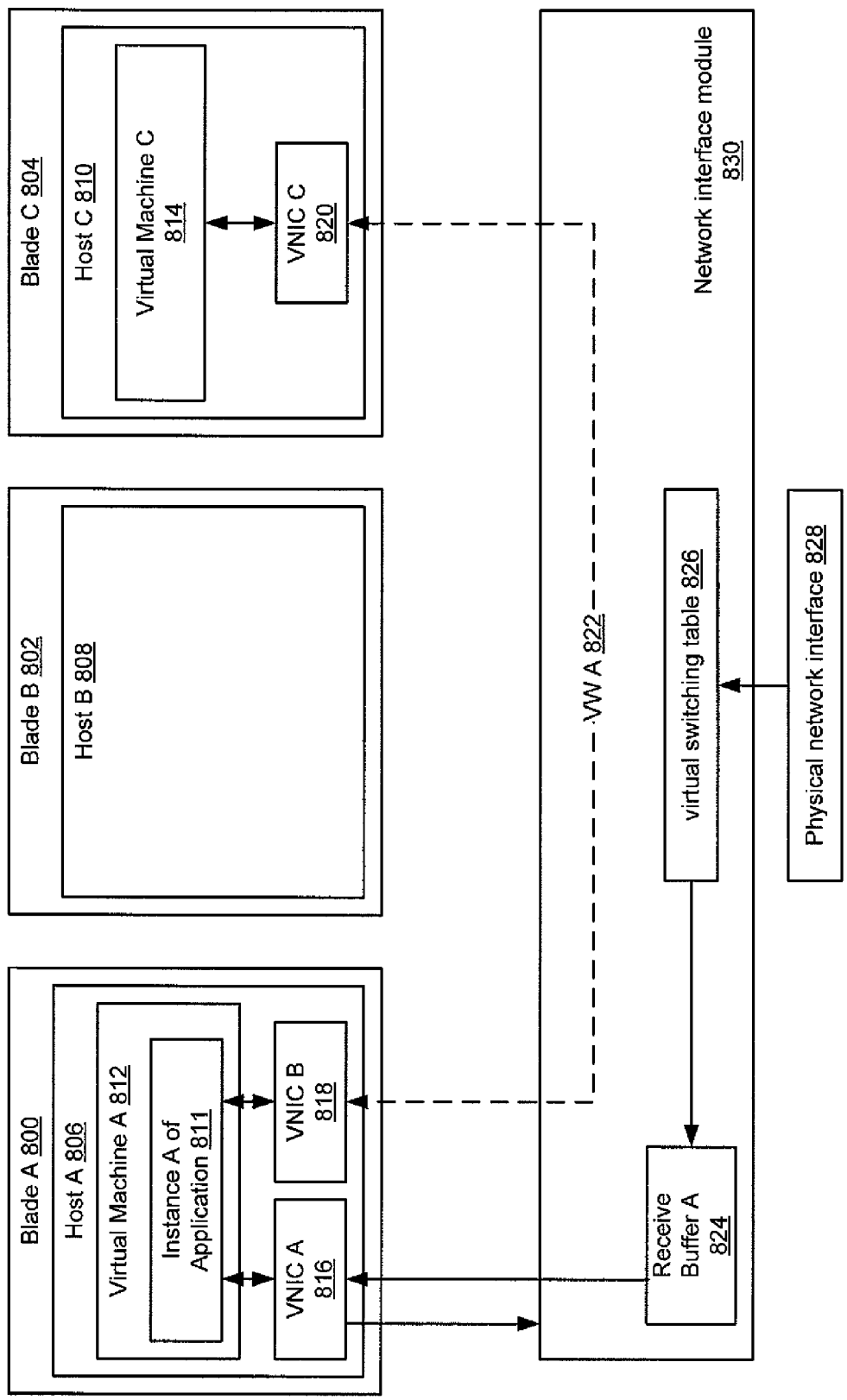
FIGS. 8A-8B show an example of scaling an application in accordance with one or more embodiments of the invention.
Figure 8B:
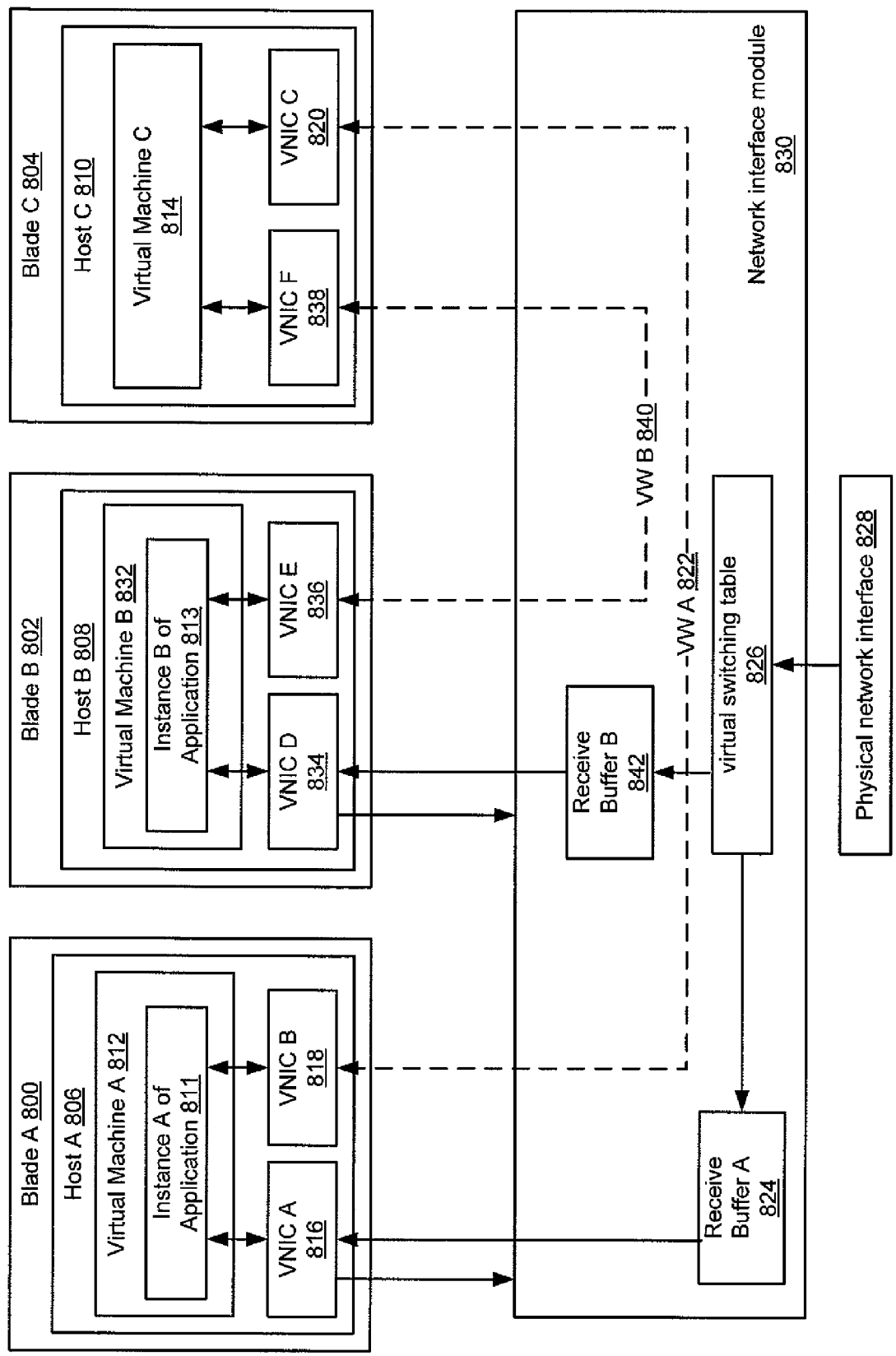

FIGS. 8A-8B show an example of scaling applications in accordance with one or more embodiments of the invention. FIGS. 8A-8B are provided as examples only, and should not be construed as limiting the scope of the invention.

Referring to FIG. 8A, consider a blade chassis (not shown) that includes Blade A (800), Blade B (802), and Blade C (804) all connected to via a chassis interconnect (not shown). Further, network traffic from sources external to the blade chassis are received and transmitted using the network interface module (830) and the physical network interface (828).

As shown in FIG. 8A, Blade A (800) includes Host A (806) executing virtual machines A (812). Virtual machine A (812) is executing Instance A of the Application (811). In this example, assume that Application is a firewall application. Instance A of the Application (811) receives network traffic from and sends network traffic to the physical network interface (828) using VNIC A (816). Host A (806) also includes VINC B (818).

Blade B (802) initially only includes Host B (808). Though not shown, Host B (808) may be executing one or more virtual machines. However, Host B (808) is not executing any instances of the application (i.e., the firewall in this example).

Blade C (804) as shown in FIG. 8A, includes Host C (810) executing virtual machine C (814). Virtual machine C (814), as shown in FIG. 8A, is not able to directly communicate with the physical network interface (828); rather, virtual machine C (814) is communicates with virtual machine A (812) through a virtual wire (VW) A (822) using VNIC B (818). Thus, all network traffic to and from virtual machine C (814) is communicated over VW A (822). VW A (822) is implemented by the virtual switching table (826) in the network interface module (830).

Based on the above, when a packet destined from virtual machine C (814) is received by the physical network interface (828), the virtual switching table (826) determines which receive buffer to direct the network traffic. In the example shown in FIG. 8A, all network traffic must pass through the firewall (i.e., Instance A of the Application (811)). Accordingly, the virtual switching table (826) directs the network traffic to receive buffer A (824). VNIC A (816) subsequently receives the network traffic in receive buffer A (824). As discussed above, the network traffic may be received using an interrupt mechanism or a polling mechanism.

Continuing with the discussion of FIG. 8A, if the firewall (i.e., Instance A of the Application (811)) determines that the network traffic is allowed to continue to virtual machine C (814), the Instance A of the Application (811) sends the packet to virtual machine C (814) over VW A (822). Alternatively, if the firewall determines that the network traffic is not allowed to continue to virtual machine C (814), then the network traffic is dropped (i.e., the packete that are not allowed to pass through the firewall are dropped).

After the a period of time, there is an increase in the volume of network traffic directed to virtual machine C (814) such that a threshold criteria (e.g., see FIG. 7A, Step 702) is exceed. In response, a determination is made to provision a new instance of the application. FIG. 8B shows the blade chassis after the new instance of the application has been provisioned.

Referring to FIG. 8B, the Instance B of the Application (813) is loaded onto Virtual Machine B (832) on Host B (808). In addition, two VNICs are instantiated in Host B (808) and associated with Instance B of the Application (813). Instance B of the Application (813) receives network traffic from and sends network traffic to the physical network interface (828) using VNIC D (834). Host B (808) also includes VINC E (836).

In addition, Host C (810) instantiates VNIC F (838). Virtual machine C (814) communicates with virtual machine B (832) through VW B (840) using VNIC E (836). Thus, all network traffic between virtual machine B (832) and virtual machine C (814) is communicated over VW B (840). VW B (840) is implemented by the virtual switching table (826) in the network interface module (830). Finally, the virtual switching table (826) is updated such that a portion of the network traffic currently directed to receive buffer A (824) is directed to receive buffer B (842).

Once instance B of the application (813) is loaded and configured (as discussed above), there are two instances of the application executing in the blade chassis. This allows network traffic destined for virtual machine C (820) to be processed by either instance of the application, thereby increasing the rate at which the network traffic reaches virtual machine C (814). At a later time, if a consolidation criteria is satisfied (see FIG. 7B, Step 752), then the configuration of the blade chassis may revert back to the configuration shown in FIG. 8A.

In one embodiment of the invention, if the application is a router and there are multiple instances of the router executing the blade chassis, each instance of the router may be associated with a routing table for a specific subnet (or set of subnets). In such cases the packets received by the physical network interface are directed to the appropriate instance of the router by the virtual switching table based on the subnet (or set of subnets) for which the packets are destined.

In one embodiment of the invention, each instance of the router may include an identical copy of the routing table. Further, the virtual switching table may be configured to evenly distribute the incoming network traffic among the instances of the router.

Those skilled in the art will appreciate that while the invention has been described with respect to using blades, the invention may be extended for use with other computer systems, which are not blades. Specifically, the invention may be extended to any computer, which includes at least memory, a processor, and a mechanism to physically connect to and communicate over the chassis bus. Examples of such computers include, but are not limited to, multi-processor servers, network appliances, and light-weight computing devices (e.g., computers that only include memory, a processor, a mechanism to physically connect to and communicate over the chassis bus), and the necessary hardware to enable the aforementioned components to interact.

Further, those skilled in the art will appreciate that if one or more computers, which are not blades, are not used to implement the invention, then an appropriate chassis may be used in place of the blade chassis.

Software instructions to perform embodiments of the invention may be stored on a non-transitory computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for scaling an application, comprising:
executing a first instance of the application on a first blade in a blade chassis, wherein the first instance of the application is associated with a first virtual network interface card (VNIC) and a second VNIC executing on the first blade;
loading a second instance of the application on a second blade in the blade chassis, wherein the second instance of the application is associated with a third VNIC and a fourth VNIC executing on the second blade;
re-programming a network express manager (NEM) to direct a portion of network traffic directed to the first VNIC to the third VNIC; and
executing the second instance of the application after the re-programming,
wherein the blade chassis comprises a Peripheral Component Interface Express (PCI-E) backplane, the NEM, and a virtual switching table (VST),
wherein the first blade connects to the blade chassis using a first PCI-E endpoint and the second blade connects to the blade chassis using a second PCI-E endpoint, and
wherein reprogramming the NEM to direct a portion of network traffic directed to the first VNIC to the third VNIC comprises:
creating, in the VST, a first mapping of a first Internet Protocol (IP) address for the third VNIC to the second PCI-E endpoint on the PCI-E backplane.

2. The method of claim 1, further comprising:
monitoring resource utilization on the first blade; and
determining, based on the resource utilization, to load the second instance of the application onto the second blade.

3. The method of claim 2, wherein the determination to load the second instance of the application onto the second blade is performed by a control operating system executing in a virtual machine located on one selected from a group consisting of the first blade, the second blade, and a third blade in the blade chassis.

4. The method of claim 1, wherein the second VNIC is connected to a fifth VNIC executing on a third blade in the blade chassis using a first virtual wire, wherein the fifth VNIC is associated with a virtual machine (VM) located on the third blade, and wherein the NEM, using the VST, implements the first virtual wire to only allow packets sent from the second VNIC to the fifth VNIC.

5. The method of claim 4, wherein the fourth VNIC is connected to a sixth VNIC executing on the third blade using a second virtual wire, wherein the sixth VNIC is associated with the VM, wherein the NEM, using the VST, implements the second virtual wire to only allow packets sent form the fourth VNIC to the sixth VNIC.

6. The method of claim 1, wherein the application is one selected from a group consisting of a switch, a router, a load balancer, and a firewall.

7. A non-transitory computer readable medium comprising a plurality of executable instructions for scaling an application, wherein the plurality of executable instructions comprises instructions to:
execute a first instance of the application on a first blade in a blade chassis, wherein the first instance of the application is associated with a first virtual network interface card (VNIC) and a second VNIC executing on the first blade;

load a second instance of the application on a second blade in the blade chassis, wherein the second instance of the application is associated with a third VNIC and a fourth VNIC executing on the second blade;
re-program a network express manager (NEM) in the blade chassis to direct a portion of network traffic directed to the first VNIC to the third VNIC; and
execute the second instance of the application,
wherein the blade chassis comprises a Peripheral Component Interface Express (PCI-E) backplane, the NEM, and a virtual switching table (VST),
wherein the first blade connects to the blade chassis using a first PCI-E endpoint and the second blade connects to the blade chassis using a second PCI-E endpoint, and
wherein reprogramming the NEM to direct a portion of network traffic directed to the first VNIC to the third VNIC comprises:
creating, in the VST, a first mapping of a first Internet Protocol (IP) address for the third VNIC to the second PCI-E endpoint on the PCI-E backplane.

8. The non-transitory computer readable medium of claim 7, wherein the plurality of executable instructions further comprises instructions to:
monitor resource utilization on the first blade; and
determine, based on the resource utilization, to load the second instance of the application onto the second blade.

9. The non-transitory computer readable medium of claim 8, wherein the determination to load the second instance of the application onto the second blade is performed by a control operating system executing in a virtual machine located on one selected from a group consisting of the first blade, the second blade, and a third blade in the blade chassis.

10. The non-transitory computer readable medium of claim 7, wherein the second VNIC is connected to a fifth VNIC executing on a third blade in the blade chassis using a first virtual wire, wherein the fifth VNIC is associated with a virtual machine (VM) located on the third blade, and wherein the NEM, using the VST, implements the first virtual wire to only allow packets sent from the second VNIC to the fifth VNIC.

11. The non-transitory computer readable medium of claim 10, wherein the fourth VNIC is connected to a sixth VNIC executing on the third blade using a second virtual wire, wherein the sixth VNIC is associated with the VM, wherein the NEM, using the VST, implements the second virtual wire to only allow packets sent from the fourth VNIC to the sixth VNIC.

12. A method for scaling a router, comprising:
executing a first instance of the router on a first blade in a blade chassis, wherein the first instance of the router is associated with a first virtual network interface card (VNIC) and a second VNIC executing on the first blade and comprises a first routing table;
loading a second instance of the router on a second blade in the blade chassis, wherein the second instance of the router is associated with a third VNIC and a fourth VNIC executing on the second blade and comprises a second routing table;
populating a second routing table using at least a portion of the first routing table;
re-programming a network express manager (NEM) in the blade chassis to direct a portion of network traffic directed to the first VNIC to the third VNIC; and
executing the second instance of the router after the re-programming, wherein the second instance of the router uses the second routing table;
wherein the blade chassis comprises a Peripheral Component Interface Express (PCI-E) backplane, the NEM, and a virtual switching table (VST),
wherein the first blade connects to the blade chassis using the first PCI-E endpoint and the second blade connects to the blade chassis using the second PCI-E endpoint, and
wherein reprogramming the NEM to direct a portion of network traffic directed to the first VNIC to the third VNIC comprises:
creating, in the VST, a first mapping of a first Internet Protocol (IP) address for the third VNIC to the second PCI-E endpoint on the PCI-E backplane.

13. The method of claim 12, wherein populating the second routing table comprises copying all entries in the first routing table.

14. The method of claim 12, wherein the second VNIC is connected to a fifth VNIC executing on a third blade in the blade chassis using a first virtual wire, wherein the fifth VNIC is associated with a virtual machine (VM) located on the third blade, wherein the NEM, using the VST, implements the first virtual wire to only allow packets sent from the second VNIC to the fifth VNIC.

* * * * *